US009681529B1

(12) United States Patent
Kuo et al.

(10) Patent No.: US 9,681,529 B1
(45) Date of Patent: Jun. 13, 2017

(54) MICROWAVE ADAPTING PLASMA TORCH MODULE

(75) Inventors: Spencer Kuo, River Edge, NJ (US); Skip Williams, Dayton, OH (US); Daniel Bivolaru, Hampton, VA (US); Campbell Carter, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 2325 days.

(21) Appl. No.: 11/621,034

(22) Filed: Jan. 8, 2007

Related U.S. Application Data

(60) Provisional application No. 60/756,654, filed on Jan. 6, 2006.

(51) Int. Cl.
*B23K 9/00* (2006.01)
*B23K 9/02* (2006.01)
*H05H 1/46* (2006.01)

(52) U.S. Cl.
CPC .................................... *H05H 1/46* (2013.01)

(58) Field of Classification Search
CPC ........... A61L 2/0011; A61L 2/14; H05H 1/24; H05H 1/38; H05H 1/40; H05H 1/44; H05H 2001/3478; H05H 2001/3426; H05H 2001/3431; H05H 2001/3436; H05H 2001/3452; H05H 2001/3421; H01J 37/32192; H01J 27/18; B08B 7/0035; H05B 7/185
USPC ............ 219/121.48, 121.36, 121.54, 121.43, 219/121.47, 121.57, 121.41, 121.5, 219/121.44, 121.52, 121.59; 118/723 MW, 723 MR, 723 I; 315/111.21, 111.31, 111.41, 111.81; 316/356; 427/577; 204/298.37, 298.38; 156/345.41, 345.48; 250/423 R, 426
See application file for complete search history.

(56) References Cited

U.S. PATENT DOCUMENTS

| | | | | | |
|---|---|---|---|---|---|
| 2,858,412 | A | * | 10/1958 | Kane et al. | 219/75 |
| 3,632,951 | A | * | 1/1972 | Klasson | 219/75 |
| 4,147,917 | A | * | 4/1979 | Jelmorini | 219/121.46 |
| 4,163,891 | A | * | 8/1979 | Komatsu et al. | 219/121.51 |
| 4,275,287 | A | * | 6/1981 | Hiratake | 219/121.52 |
| 4,348,357 | A | * | 9/1982 | Bithell | 422/22 |
| 4,423,304 | A | * | 12/1983 | Bass et al. | 219/121.48 |
| 4,463,245 | A | * | 7/1984 | McNeil | 219/121.48 |
| 4,473,736 | A | * | 9/1984 | Bloyet et al. | 219/121.48 |
| 4,481,636 | A | * | 11/1984 | Curr et al. | 373/18 |
| 4,549,065 | A | * | 10/1985 | Camacho et al. | 219/121.48 |
| 4,558,201 | A | * | 12/1985 | Hatch | 219/121.48 |
| 4,615,225 | A | * | 10/1986 | Sainz | 73/864.33 |
| 4,890,294 | A | * | 12/1989 | Nishimae et al. | 372/57 |
| 4,908,492 | A | * | 3/1990 | Okamoto et al. | 219/121.52 |
| 5,144,110 | A | * | 9/1992 | Marantz et al. | 219/121.48 |

(Continued)

*Primary Examiner* — Eric Stapleton
(74) *Attorney, Agent, or Firm* — AFMCLO/JAZ; Charles R Figer, Jr.

(57) ABSTRACT

A plasma torch module combining arc and microwave discharges is disclosed. One embodiment serves to enhance the size and enthalpy of the plasma torch and has a very large operational range of the airflow rate, from subsonic to supersonic flow speed. Increase of airflow in the torch operation can increase not only the size of the torch plasma and the cycle energy of the arc discharge but also the lifetime of the torch module and the torch can operate stably with very low airflow.

2 Claims, 8 Drawing Sheets

(56) References Cited

U.S. PATENT DOCUMENTS

| | | | | |
|---|---|---|---|---|
| 5,147,998 | A * | 9/1992 | Tsantrizos et al. | 219/121.5 |
| 5,403,453 | A * | 4/1995 | Roth et al. | 204/164 |
| 5,414,324 | A * | 5/1995 | Roth et al. | 315/111.21 |
| 5,587,207 | A * | 12/1996 | Gorokhovsky | 427/571 |
| 5,847,355 | A * | 12/1998 | Barmatz et al. | 219/121.59 |
| 5,876,684 | A * | 3/1999 | Withers et al. | 423/445 B |
| 5,990,627 | A * | 11/1999 | Chen et al. | 315/117 |
| 6,005,349 | A * | 12/1999 | Kunhardt et al. | 315/111.21 |
| 6,060,836 | A * | 5/2000 | Maeno et al. | 315/111.21 |
| 6,137,231 | A * | 10/2000 | Anders et al. | 315/111.21 |
| 6,215,091 | B1 * | 4/2001 | Chung et al. | 219/121.48 |
| 6,249,078 | B1 * | 6/2001 | Mimasu | 313/161 |
| 6,300,720 | B1 * | 10/2001 | Birx | 315/111.21 |
| 6,329,628 | B1 * | 12/2001 | Kuo et al. | 219/121.54 |
| 6,362,449 | B1 * | 3/2002 | Hadidi et al. | 219/121.36 |
| 6,388,225 | B1 * | 5/2002 | Blum et al. | 219/121.48 |
| 6,504,307 | B1 * | 1/2003 | Malik et al. | 315/111.21 |
| 6,614,000 | B1 * | 9/2003 | Bessho et al. | 219/121.48 |
| 6,686,558 | B2 * | 2/2004 | Selitser | 219/121.52 |
| 6,734,385 | B1 * | 5/2004 | Bark et al. | 219/121.48 |
| 6,806,651 | B1 * | 10/2004 | Chistyakov | 315/111.21 |
| 6,806,652 | B1 * | 10/2004 | Chistyakov | 315/111.21 |
| 6,855,906 | B2 * | 2/2005 | Brailove | 219/121.36 |
| 7,091,441 | B1 * | 8/2006 | Kuo | 219/121.36 |
| 7,335,850 | B2 * | 2/2008 | Kuo et al. | 219/121.5 |
| 7,375,302 | B2 * | 5/2008 | Twarog et al. | 219/121.52 |
| 7,572,998 | B2 * | 8/2009 | Mohamed et al. | 219/121.5 |
| 2003/0160033 | A1 * | 8/2003 | Johnson et al. | 219/121.51 |
| 2003/0173339 | A1 * | 9/2003 | Fryer et al. | 219/121.5 |
| 2004/0182517 | A1 * | 9/2004 | Lai et al. | 156/345.48 |
| 2004/0212311 | A1 * | 10/2004 | Chistyakov | 315/111.21 |
| 2004/0212312 | A1 * | 10/2004 | Chistyakov | 315/111.21 |
| 2005/0199594 | A1 * | 9/2005 | Baillot | 219/121.48 |
| 2006/0027539 | A1 * | 2/2006 | Golkowski | 219/121.59 |
| 2006/0175302 | A1 * | 8/2006 | Kuo | 219/121.36 |
| 2007/0017636 | A1 * | 1/2007 | Goto et al. | 156/345.47 |

* cited by examiner

MICROWAVE ADAPTING PLASMA TORCH MODULE

CROSS-REFERENCES TO RELATED APPLICATIONS

This application claims the benefit of the filing date pursuant to 35 U.S.C. §119(e) of Provisional Application Ser. No. 60/756,654, filed 6 Jan. 2006, the disclosure of which is hereby incorporated herein by reference.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention relates to the field of plasma generation devices or "plasma sources."

Description of the Related Art

Plasma sources may be used in a variety of applications, including those requiring plasmas to be exposed directly to the open air. The applications include, for example, spray coating and materials synthesis and as an ignition aid in a hydrocarbon-fueled supersonic-combustor.

For a typical hydrocarbon-fueled supersonic combustor startup scenario, the fuel-air mixture will not auto-ignite and some ignition aid is therefore necessary to initiate main-duct combustion. The residence time through a typical combustion region is short, on the order of 1 millisecond (ms). Accordingly, means for reducing the ignition delay time and to increase the rate of combustion of hydrocarbon fuels are essential to the operation of the combustor. To fulfill these purposes, the igniter must provide adequate thermal energy to light the fuel and the delivered thermal energy should be able to deeply penetrate into the supersonic cross-flow.

Dense atmospheric-pressure plasma can be produced through dc/low frequency capacitive or high frequency inductive arc discharges, which require adding gas flows to stabilize the discharges and to carry the generated plasmas out of the discharge regions to form torches. The inductive torch and non-transferred dc torch employ high current power supply and require very high gas flow rate to achieve stable operation. Consequently, the structures of these torches are relatively large and are therefore unsuitable for certain applications. A typical torch module can run in dc or low frequency ac mode and can produce low power (hundreds of watts) or high power (a few kW in 60-Hz periodic mode or hundreds of kW in pulsed mode) plasma torches; however, the size of the plasma torch produced by such module is generally limited by the gap between the electrodes and depends strongly on the gas flow rate.

In view of the foregoing deficiencies of known plasma torches, there is a need for a plasma source that is portable and can generate a stable and sizable plasma torch independent of the gas flow rate.

BRIEF DESCRIPTION OF THE DRAWINGS

While the specification concludes with claims particularly pointing out and distinctly claiming that which is regarded as the present invention, the features, objects, and advantages of the present invention can be more readily ascertained with reference to the following description, in conjunction with the accompanying drawings, in which:

FIG. 7 is a representation of the plume images with a neutral filter at different air supply pressures generated before and after the magnetron is turned on;

DETAILED DESCRIPTION

Figure 1A:
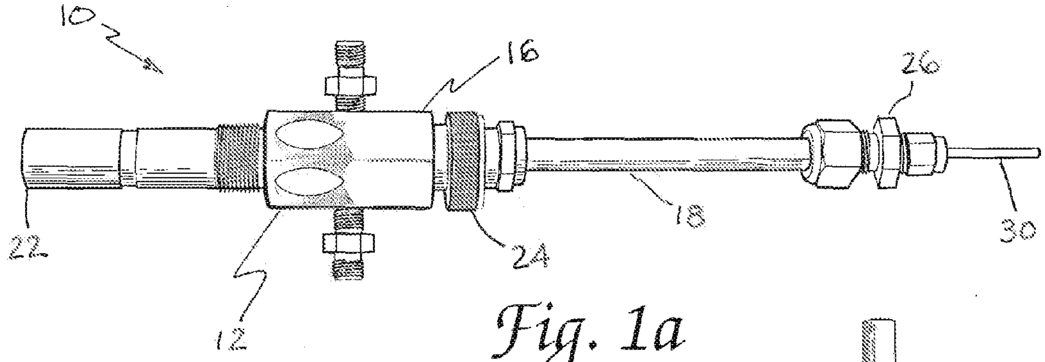
FIG. 1 is a diagrammatic view of one embodiment of the torch module.
Figure 1B:
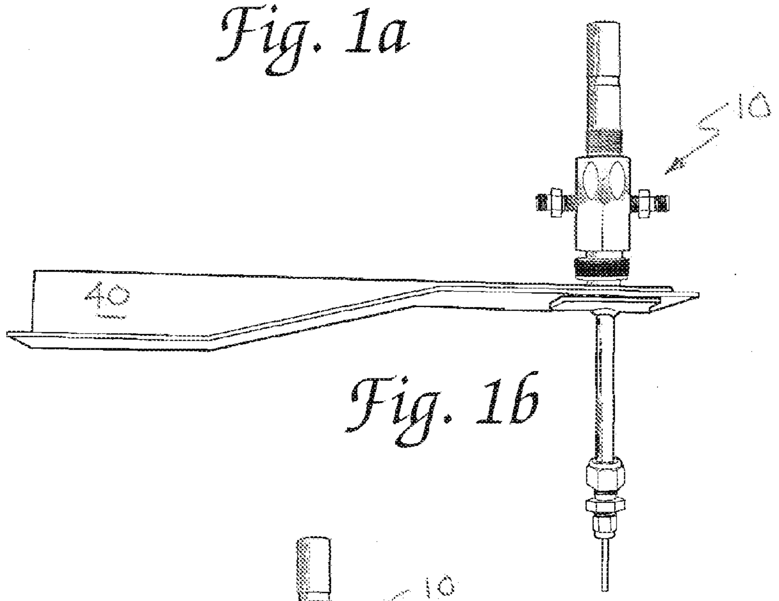
Figure 1C:
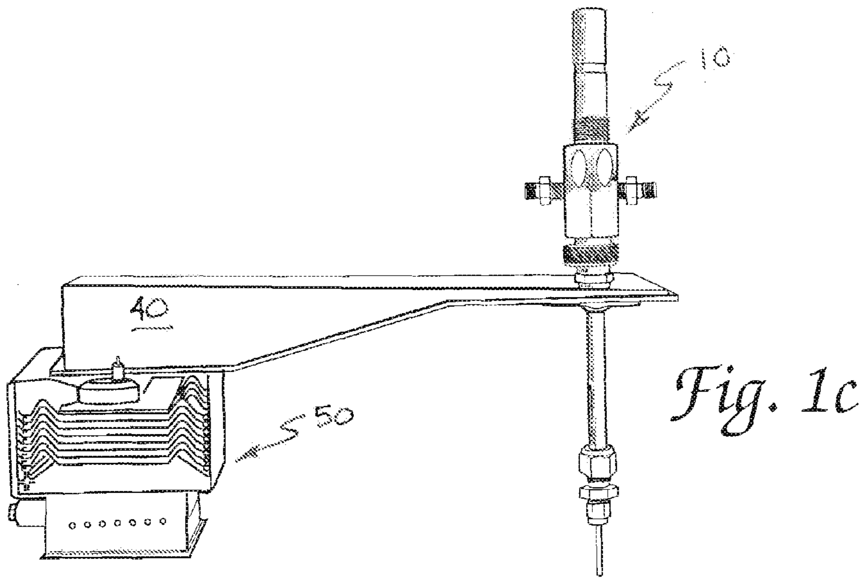

Referring to the drawings, FIG. 1*a* depicts an embodiment of the torch module 10, having a frame 12, including a bottom section with a ceramic fitting 16 for connecting to a ceramic insulator 18, a center section and a top section having a nozzle 22. A tube (central electrode) 30 is connected to the ceramic insulator 18 and frame 12, by means of connectors 24 and 26. FIG. 1*b* shows the torch module 10 engaged with the tapered cavity 40. FIG. 1*c* shows the torch module 10 and tapered cavity 40 engaged with the magnetron 50.

Figure 2A:
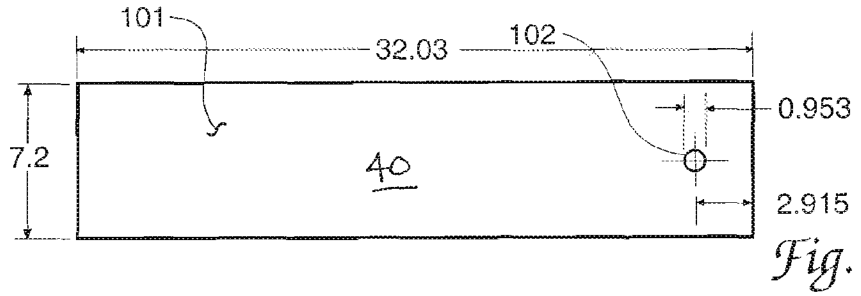
FIG. 2 is a schematic view of one embodiment of a tapered cavity according to one embodiment.
Figure 2B:
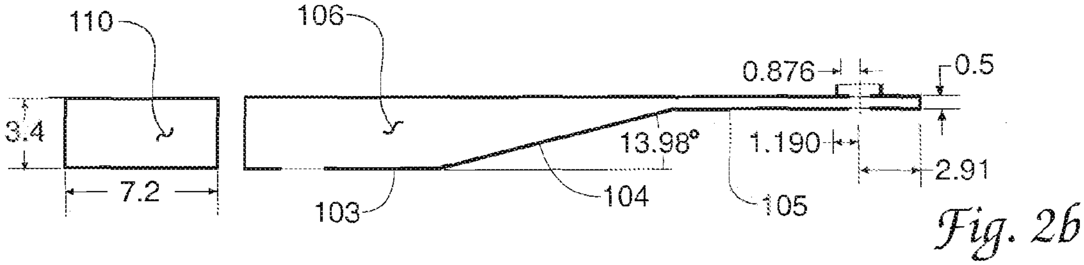
Figure 2C:
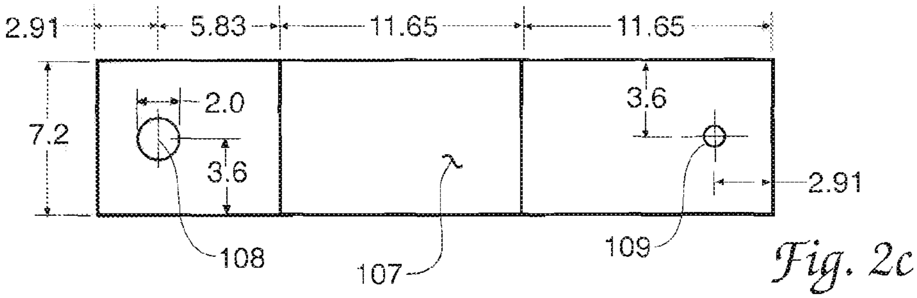

Details of one embodiment of the tapered cavity 40 are shown in FIG. 2, where the top view is shown in FIG. 2*a*, the side view in FIG. 2*b* and the bottom view in FIG. 2*c*. The cross section of the non-tapered section 110 is the same as that of a standard S-band (WR-284) waveguide.

Following are the details of one specific embodiment. Referring to FIG. 2, an S-band rectangular waveguide having a cross section 110 of 7.2 cm×3.4 cm is tapered to a cross section of 7.2 cm×0.5 cm in one embodiment. The two ends of the waveguide are terminated by conducting plates to form a rectangular cavity. Thus this cavity consists of three sections. Sections on two sides have uniform cross sections. One section 106 is non-tapered having a length at 103 of $3\lambda_z/8$ and the other section 105 is tapered with a length of $\lambda_z/2$, where $\lambda_z=\lambda_0/[1-(\lambda_0/2a)^2]^{1/2}=23.3$ cm is the axial wavelength for the $TE_{103}$ mode, $\lambda_0=12.25$ cm is the free space wavelength of the microwave at 2.45 GHz, and a=7.2 cm is the dimension of the wider side of the cross section of the cavity. The middle transition section 104, tapering the cross section from 7.2 cm×3.4 cm to 7.2 cm×0.5 cm, has a length of $\lambda_z/2$ and a slope angle $\theta=\tan^{-1}(2.9/11.65)=14°$. Microwave generated by a magnetron (2.45 GHz, 700 W to 1.5 kW) radiates into this cavity at a location 108 about a quarter wavelength ($\lambda_0/4$) (more precisely, $\lambda_z/8$) away from the shorted-end of the non-tapered section of the cavity. The quarter wavelength in the axial direction of the uniform sections of the cavity is 5.83 cm and the wavelength in the middle transition section is expected to be a little shorter; thus, the total axial length of 32 cm matches the length requirement for the $TE_{103}$ cavity mode. This is confirmed by the measurement described as follows.

Figure 3:
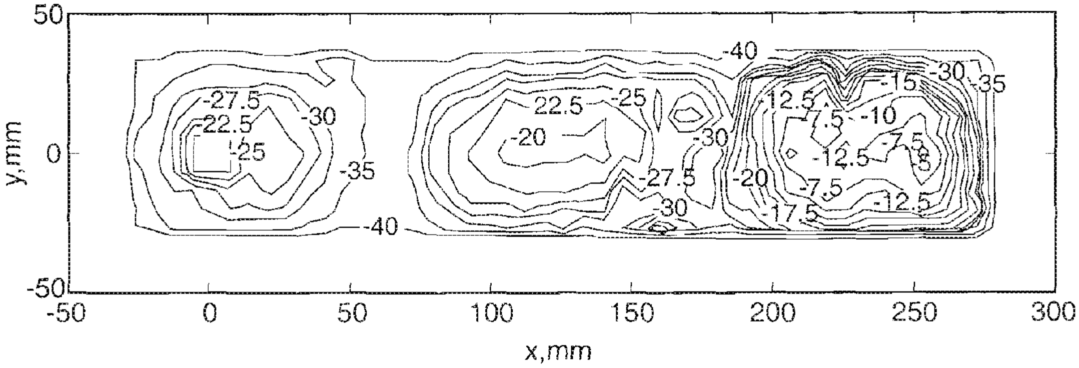
FIG. 3 is a plot of the microwave electric field distribution on the bottom wall of the tapered cavity.

A small monopole antenna measured the spatial distribution of the microwave electric field normal to the bottom wall of the cavity. This antenna was made of an insulated wire of 1 mm diameter and 4 mm long, which was connected to the central line of a 50Ω coaxial line. To carry out the measurements, the bottom wall of the cavity was replaced by a perforated screen having uniform distributed holes of 2 mm diameter and separated by about 6.7 mm. Thus the antenna could be inserted into the tapered cavity through the holes of the screen wall. It measured the electric field component perpendicular to the wall, which is the electric field direction of interest and is also the anticipated field direction of the $TE_{103}$ mode. A spectrum analyzer recorded the signal power (in dBm) collected by the antenna. The results are presented in FIG. 3, in which the number labeled for each constant power contour has the unit of dBm. The measured field intensity distribution confirms that the cavity mode is $TE_{103}$ mode.

At the location of $\lambda_z/8=2.92$ cm away from its shorted-end of the narrow section of the cavity, two aligned holes 109 and 102 on the bottom 107 and top 101 walls are introduced. The top hole has a diameter of 0.955 cm and a nut as fitting holder is welded on top of the hole. The bottom hole on the cavity wall has a diameter of 0.953 cm fitted exactly to the ceramic insulator in a torch module. A new torch module is designed and fabricated as shown in FIG. 1. The cylindrical torch module, which uses the frame of a cylindrical tube having an outer diameter of 16.5 mm as the grounded outer electrode, is described as follows.

The concentric electrodes in the module are separated at the nozzle exit location by a gap of 2.25 mm and insulated by a ceramic tube, having outer and inner diameters of 0.953 cm and 0.381 cm and dielectric constant $\in_r=8$, which hosts the central electrode. The frame, having a length of 14.6 cm, consists of three sections. The bottom section of 5.1 cm length, having an inner diameter slightly larger than 0.953 mm, is tied fit with the ceramic insulator. It makes it easy to center the central electrode hosted by the ceramic insulator. In the torch operation, gas flow through the gap between electrodes is desirable. Thus the central section having a length 9 cm is open to a much large inner diameter of 1.27 cm. To make this section function as a gas plenum chamber and to increase the gas flow speed in the discharge region, a replaceable nozzle 22 of 0.2 cm length is inserted at the top of the frame. This nozzle 22 has an inner diameter of 0.75 cm. The ceramic insulator 18 does not cover the central electrode in the nozzle 22. It is placed slightly below the bottom of the nozzle 22. The tube 30, or central electrode, may be made of tungsten, which has the inner and outer diameters of 0.1 cm and 0.3 cm and adds an additional flow path in the module. Thus this torch module has two flow paths and the one through the tungsten tube can be used for fuel injection purpose.

Referring to FIG. 1*b*, this torch module 10 is then installed through the holder, as shown, by inserting the bottom part containing only the central electrode and the ceramic insulator 18 of the torch module 10 through these two aligned holes. The portion (0.5 cm) of the central electrode of the torch module inside the tapered cavity 40 functions as a receiving antenna and the frame (14.6 cm) of the torch module above the top wall of the tapered cavity 40 functions as an open-end transmission line. The combination of these two functions becomes a microwave adaptor. In this arrangement, the torch module functions not only as a torch module but also as a microwave adaptor. Referring to FIG. 1*c*, the magnetron 50 for microwave generation is installed at the other side of the tapered cavity 40.

Figure 4:
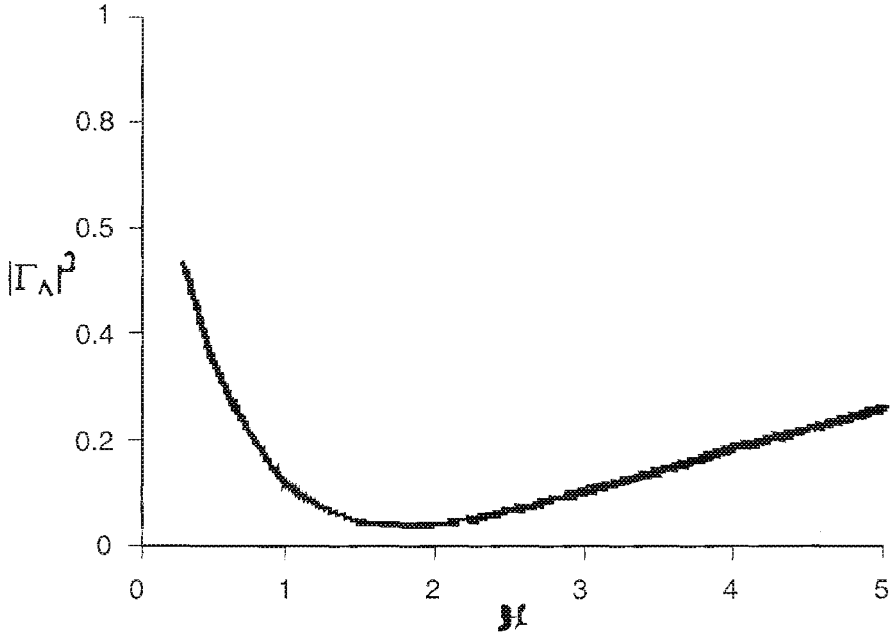
FIG. 4 is a graph of the Reflectance of the microwave adaptor as a function of the normalized load resistance.

The microwave power coupling efficiency depends on the matching condition of the load. Since plasma torch is a dynamic load, i.e., a time varying resistive load, a design to achieve a perfect matching is not possible. However, the structure of this hybrid arc/microwave torch module is designed to provide excellent microwave coupling efficiency. This is verified by the result of the numerical analysis on the dependence of the reflectance $|\Gamma_A|^2$ on the load resistance $Z_L$. As shown in FIG. 4, the power coupling efficiency $(1-|\Gamma_A|^2)>80\%$ for $38\Omega<Z_L<200\Omega$, a relatively large range of load variation. This region corresponds to before and after the peak of the arc discharge.

Figure 5:
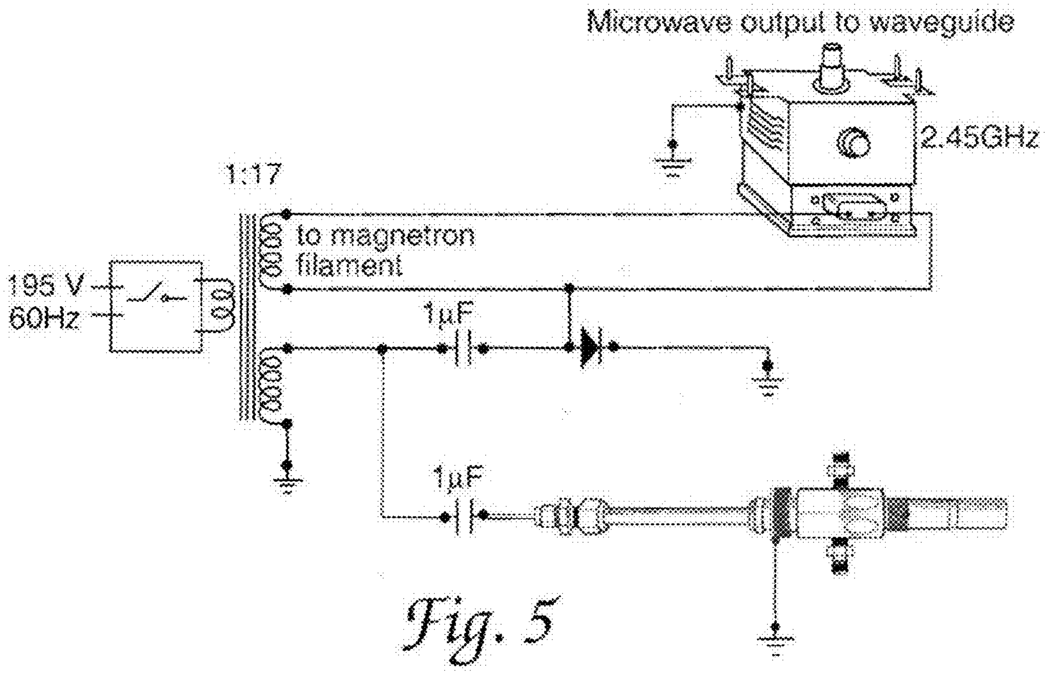
FIG. 5 is a circuit diagram of the power supply according to one embodiment.

FIG. 5 is a representative circuit diagram of the power supply used in one embodiment of the torch device to light the torch module and to run the magnetron 50 simultaneously. A single power transformer with a turn ratio of 1:17 is used to step up the 60-Hz line-voltage of 208 V (rms) to 3.5 kV (rms), which is applied to both devices through serially connecting two 1 μF capacitors, one for each device. However, both devices do not need 3.5 kV (rms) in their operations; a Variac is used to vary the input voltage from 175 V to 208 V. The power of the arc discharge increases with the increase of the capacitance of the capacitor in the circuit. Three values of 1, 2, and 3 μF have been used. The magnetron 50, which has a grounded anode, is then connected in parallel with a diode (15 kV and 750 mA rating) to limit only negative voltage applied to the cathode. The optimal operation condition is when the discharge pulse and microwave pulse overlap each other. Moreover, the discharge pulse is shorter than the microwave pulse; it also prefers to have the arc discharge to produce seeding charges right at the beginning of the microwave pulse. The arc discharges occur in both positive and negative voltage cycles of the ac input; it turns out that microwave affects the plasmas generated during both discharges.

This circuit keeps the arc discharge to synchronize with the microwave discharge in each cycle. i.e., one of the arc discharge pulses in each cycle overlaps with the microwave pulse and also starts right at the beginning of the microwave pulse.

Figure 6:
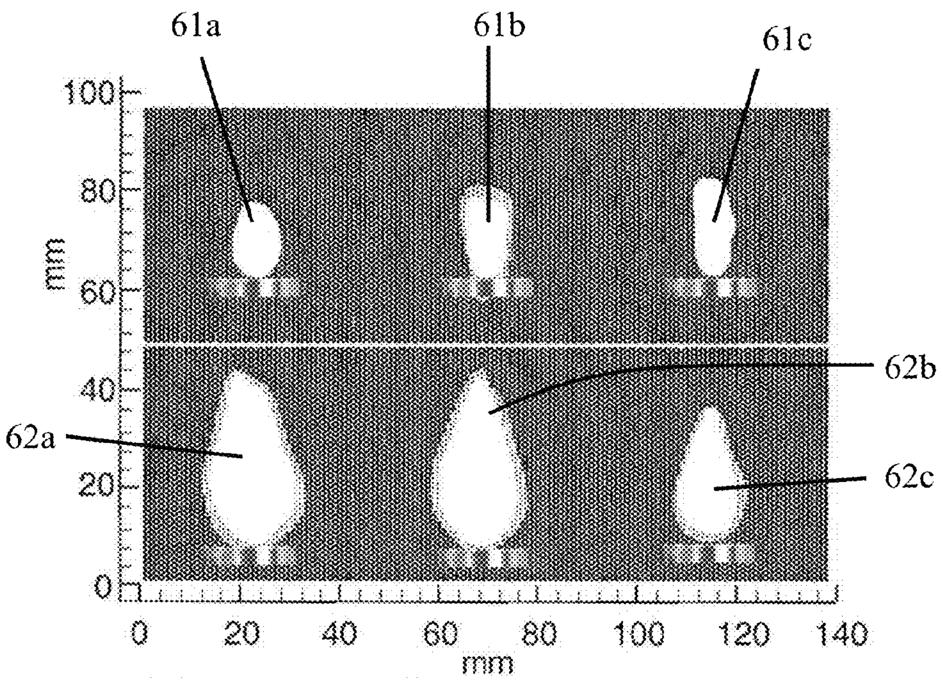
FIG. 6 is a representation of the plume images of a plasma torch without an optical filter at different air supply pressures generated with and without microwave.
Figure 7:
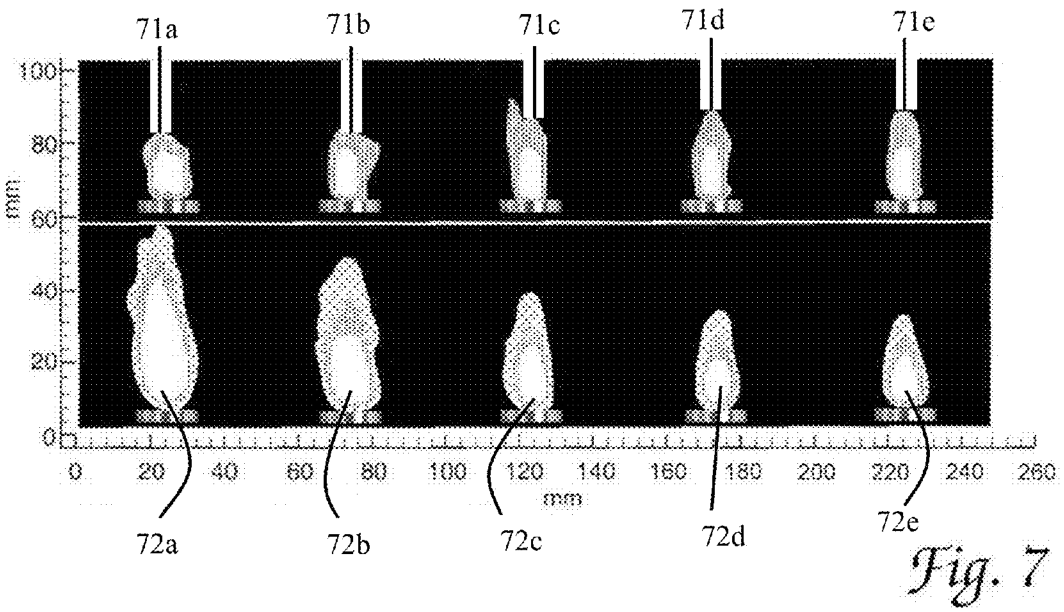

The torch may be operated in the open air using compressed air as the feedstock. It can run stably over a very large now rate range, with flow speed from subsonic to supersonic. The effect of microwave on the size and enthalpy of the plasma torch varies with the gas flow rate. This is demonstrated in FIG. 6 by a set of plume images (without optical filter) of plasma torches generated by this device. The three pairs of plume images 61*a*, 61*b* and 61*c* with microwave off (top row) and plume images 62*a*, 62*b* and 62*c* on the (bottom row) correspond to the air supply pressures of 1.36, 2.04, and 4.76 atm, respectively, where the flow speeds at the nozzle exit of the torch module are subsonic in plume images 61*a*, 61*b*, 62*a*, 62*b* and is supersonic in plume images 61*c* and 62*c*. As shown, microwave significantly enhances the luminosity of the plasma plume, which provides an indirect indication on the enhancement of the plasma enthalpy. It also increases the height and the volume of the plasma torch significantly at low gas flow rate. A neutral filter is used to cut down the luminosity intensities of plasma plumes to prevent over-exposure of the plume images. The height results are shown in FIG. 7 for a better comparison on the heights and by inference the volumes of the plasma torches. Five pairs of plume images 71*a*, 71*b*, 71*c*, 71*d* and 71*e* with the microwave off (top row) and plume images 72*a*, 72*b*, 72*c*, 72*d* and 72*e* with the microwave on (bottom row) are shown in FIG. 7. The plume images 71*a* & 72*a* through 71*e* & 72*e* correspond to the air supply pressures of 1.36, 2.04, 3.4, 4.76, and 5.44 atm, respectively, where the flow speeds at the nozzle exit of the torch module arc subsonic in plume images 71*a* & 72*a* through 71*c* & 72*c* are supersonic in plume images 71*d* & 72*d* and 71*e* & 72*e*. The Responsive to Non-Final Office Action mailed 12/17/10 dependency of the height and the volume of the plasma torch on the microwave and air supply pressure is similar to that observed in FIG. 6. Comparing the top-row and bottom-row plume images in FIG. 7, it is seen that, with the application of microwave power, the respective plume heights increase by more than 300%, 100%, 30%, 20%, and 10%, and the respective plume volumes, increase by approximately 900%, 400%, 180%, 100%, and 50%; indicating that the effect of applying the microwave power decreases with increasing flow speed. As the air supply pressure is increased, thereby increasing the flow speed, the size of the arc plasma torch shown in the top row of FIG. 7 also increases, except at the transition from subsonic plume image 71*c* & 72*c* to supersonic plume image 71*d* & 72*d*. Alternatively, the plume sizes of the microwave-enhanced plasma torches shown in the bottom row of FIG. 7 decrease with increasing flow speed but are still enhanced compared with the arc only images as indicated by lower luminosity of the arc only plasma plumes. This dependence most likely results from the fact that the fixed applied power has to energize more gas with less interaction time as the flow rate increases, and the size of the plasma torch becomes dictated by the flow speed. At the same supply pressure, the heights of the microwave augmented plasma plumes 72*d* & 72*e* are only slightly larger than the corresponding arc plasma plumes 71*d* & 71*e*. However, the volume and the luminosity intensity of the plasma plume are still increased considerably by the application of the microwave power.

Since the microwave has significantly increased the size and the brightness of the torch, a torch in this arrangement is particularly attractive to the application for igniting the hydrocarbon-fuelled scramjet engine. As an effective igniter, the plasma torch has to penetrate deeply into the supersonic cross flow in the combustor. The arc torch relies on the applied gas flow to push the plasma torch, which has to overcome the blow by the supersonic cross flow. However, the plasma enthalpy decreases as the flow rate increases; and ignition and combustion of fuel prefer high plasma enthalpy. On the other hand, microwave field is not affected by the supersonic cross flow in the combustor, so the generated microwave plasma may still penetrate deeply into the supersonic cross flow even operating at low airflow rate. When both torches operate at the same power, the enthalpy of the microwave plasma torch can be significantly higher than that of the arc plasma torch, which has to operate at a much higher airflow rate to increase its size.

In the described embodiment, the torch module is used not only to generate the arc plasma, but also to couple the microwave power (in this example, approximately 2.45 GHz with time average powers of 700 W to 1.5 kW) from a tapered rectangular cavity to the arc plasma for enhancing the size and enthalpy of the plasma torch as well as the stability and uniformity of the arc discharges. This additional microwave power enhances the size and enthalpy of the plasma torch considerably. Because the electrodes of the torch module do not bound the microwave discharge, this embodiment does not need gas flow in its operation and yet can produce sizable plasma. On the other hand, the torch module adds the flexibility to introduce gas flow in the operation. Gas flow increases the size of the plasma torch and provides cooling to the electrodes of the torch module. The gas plenum chamber providing the gas flow is integrated into the body of the torch module and the central electrode of the torch module may be made of a tungsten tube, which has, in one embodiment, the inner and outer diameters of 1 mm and 3 mm to add an additional flow path in the module for the fuel injection purpose. The whole system can be integrated into a portable unit.

Figure 8A:
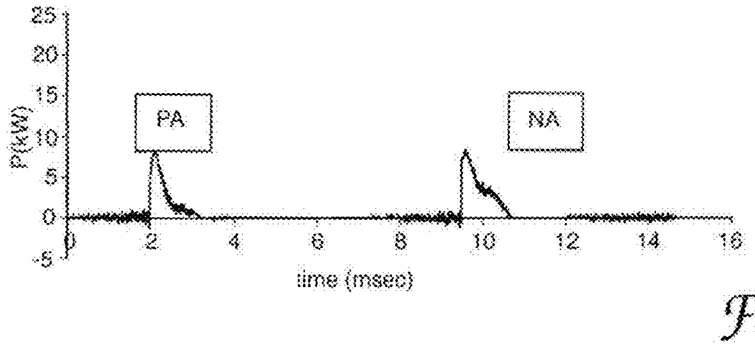
FIG. 8 is a graph depicting the power functions of two arc discharges.
Figure 8B:
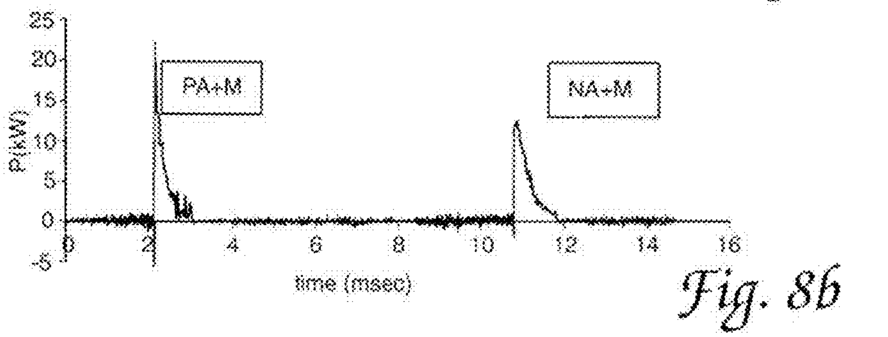

The time varying voltage V and current I of the discharge were measured using a digital oscilloscope. The product of the V and I functions gives the instantaneous power function. The arc discharge occurs in each half cycle, but the magnetron 50 runs only during the negative-voltage half cycle. Thus the microwave pulse is synchronous with the negative discharge pulse. The power functions in one cycle for discharges without and with the presence of microwave are presented in FIGS. 8*a* and 8*b* for comparison. The supply pressure of the torch module is 1.16 atm. As shown, the microwave has enhanced not only the peak power of the negative discharge, but also that of the positive discharge. The peak power in the negative discharge pulse is increased from 8 kW to 12 kW, and that of the positive discharge pulse is even increased to more than double. This is realized because the microwave helps to reduce the drop of the discharge voltage while the discharge current is increasing.

Figure 9:
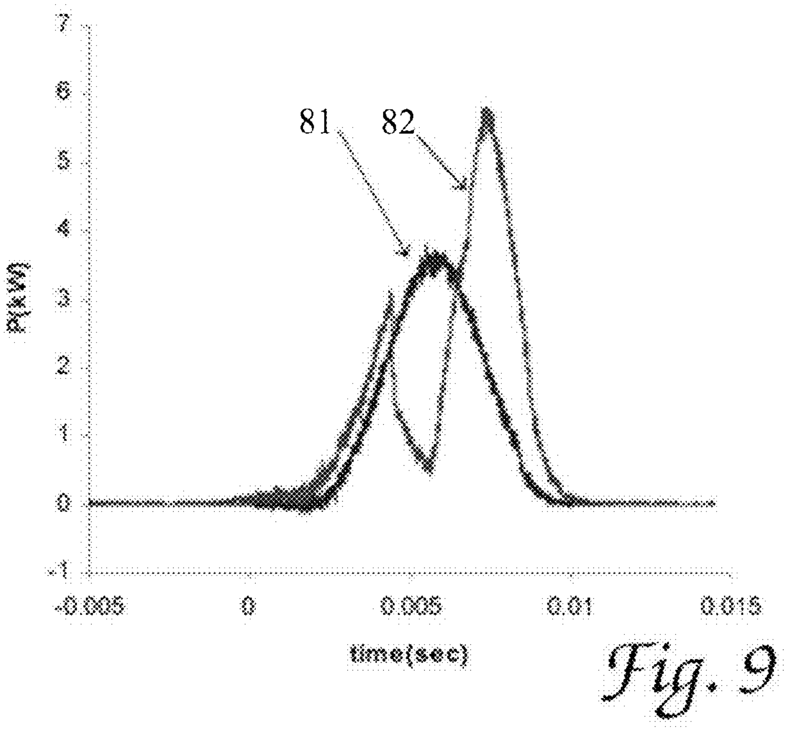
FIG. 9 is a graph showing the input power functions of the magnetron without and with simultaneous arc discharges.
Figure 12:
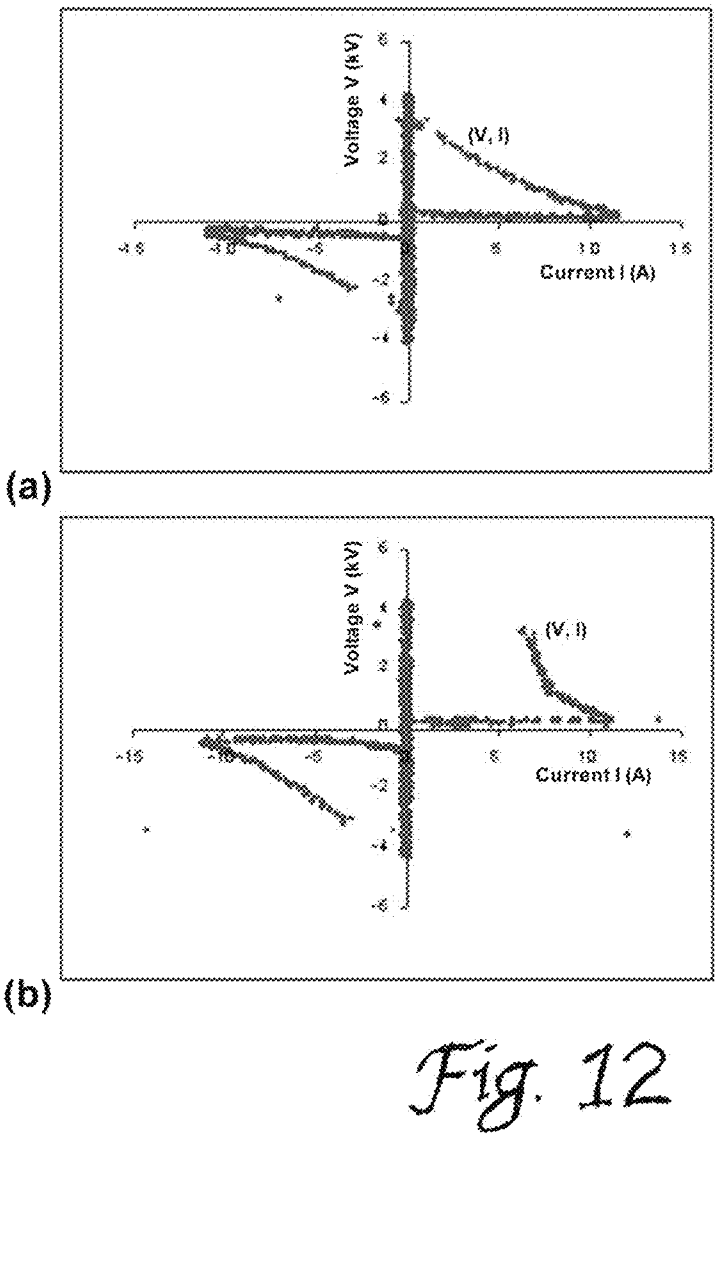
FIG. 12 is a graph presenting the V-I characteristics of two arc discharges without and with the presence of microwave.

The V-I characteristic plots shown in FIGS. 12*a* and 12*b*, for discharges without and with the presence of microwave, respectively, demonstrate this point. As shown, the peaks of the discharge currents in both cases are about the same, however, the discharge voltages at current peaks in the case with microwave presence are higher. Consequently, the peak of the product of the V and I functions is increased. It is also indicated in FIG. 12*b* that microwave increases considerably the breakdown voltage in the positive discharge. When the central electrode is positive, it collects electrons produced by the discharge. The microwave field enhances the electron mobility, and thus the transit-time loss of electrons to the central electrode, which in turn increases the breakdown voltage. The microwave effect on the positive discharge is likely attributed to the circuit arrangement and cavity setup. The arc discharge affects the operation of the magnetron in the present circuit arrangement. This is demonstrated in FIG. 9, which shows the input power functions of the magnetron without a simultaneous discharge 81 and with a simultaneous arc discharge 82. The arc discharge causes the input power function of the magnetron to split. This is because of the voltage drop caused by too much current drawn by the arc discharge. However, total microwave cycle energy remains nearly unchanged. The negative arc discharge delays the start of the magnetron and the cavity prolongs the storing time of the remaining microwave after the negative arc discharge.

Figure 10:
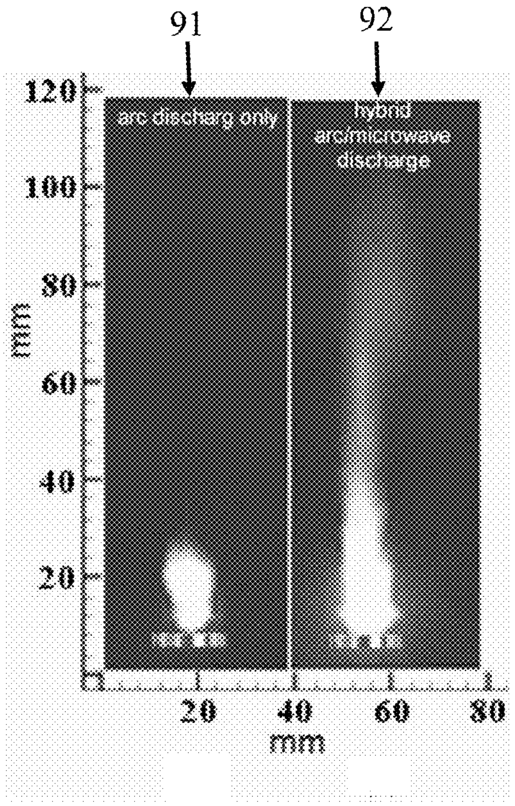
FIG. 10 is a representation of plasma torch plumes.
Figure 11A:
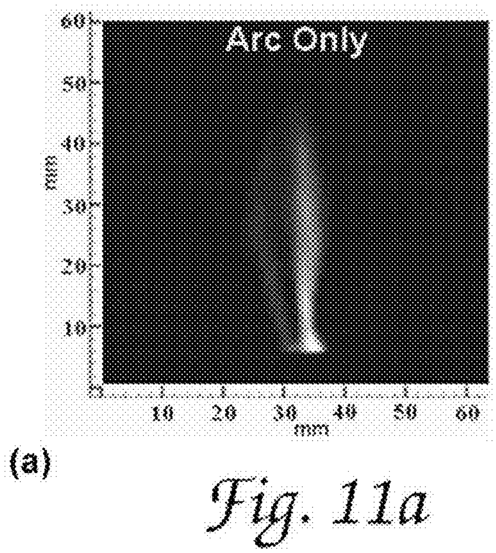
FIG. 11 is a representation of plasma plume emissions corresponding to the discharge region generated by an arc discharge without and with the presence of microwave.
Figure 11B:
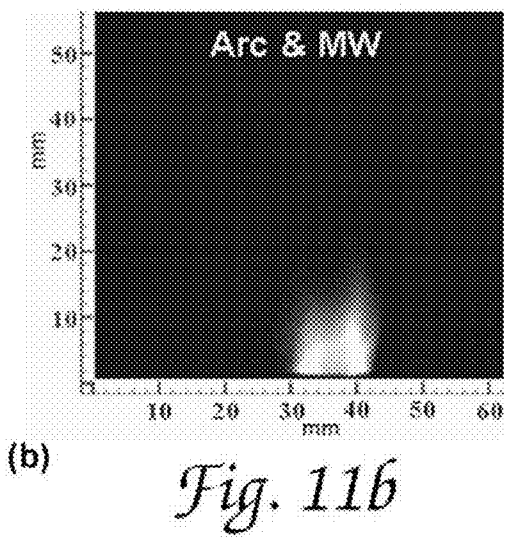

The torch module can be operated as a combined igniter/fuel injector. Tests have been conducted using gaseous ethylene fuel with the flow rate of 9 standard liters per J minute (SLM) injected through the central electrode, a tungsten-carbide tube, corresponding to 160 m/s fuel velocity at 298 K. The flame plume was observed when the torch was run with airflow rates ranging from 10-100 SLM with microwave power applied. This airflow rate range corresponded to air velocities of 6-65 mls at 298 K. Ignition under these conditions is illustrated in FIG. 10 with arc discharge 92. The plasma plume of a second arc discharge 91 (without microwave) operated in the same condition is shown in FIG. 10 for comparison. As shown, fuel was not ignited. This effect is understood because fuel was injected from the central port of the module, which was outside the main arc discharge region. An estimate of the discharge region can be seen in the images shown in FIG. 11. FIG. 11*a* is the arc plasma plume emission image recorded with an interline-transfer CCD camera with a 100 μs exposure. This image was recorded through a 1 nm bandpass interference filter centered at 405 nm, and the high intensity region was correlated to energy deposition by the plasma. However, as microwave was introduced, the plasma torch distributes more uniformly across the electrodes as seen in FIG. 11*a*. In FIG. 11*b*, the plasma distribution is more uniform and has a higher density in the central region of the hollow central electrode where the fuel is ejected. The microwave energy has also significantly enhanced the size and enthalpy (evidenced by the luminosity) of the plasma torch.

Characteristics of the described and illustrated embodiments are intended for illustrative purposes and are not to be considered limiting or restrictive. It is to be understood that various adaptations and modifications may be made to the embodiments presented herein by those skilled in the art without departing from the spirit and scope of the invention, as defined by the following claims and equivalents thereof.

That which is claimed is:

1. A microwave adapted plasma torch module configured to generate a plasma in air, comprising:
- a torch frame having an outer electrode and an inner electrode;
- a ceramic insulator positioned between the inner electrode and the outer electrode;
- a cavity including:
  - a non-tapered section having a first cross section and a top and a bottom surface, each of said surfaces defining holes for receiving the inner electrode and the ceramic insulator; and
  - a tapered section coupled to and in communication with the non-tapered section having a cross section tapering from the first cross section to a second cross section, the tapered section engaging with a means for generating a microwave pulse discharge,
  - wherein an area of the first cross section is less than an area of the second cross section;
- a means for generating an arc pulse discharge; and
- a means for synchronizing the arc pulse discharge and the microwave pulse discharge such that the arc pulse discharge overlaps with the microwave pulse discharge to generate the plasma in air,
- wherein the arc pulse discharge is shorter than the microwave pulse discharge.

2. The microwave adapted plasma torch module of claim 1, further comprising a means for starting the arc pulse discharge at a beginning of the microwave pulse discharge.

* * * * *